T. C. CRAVEN.
Combined Hay Spreader and Elevator.
No. 51,650 — Patented Dec. 19, 1865.
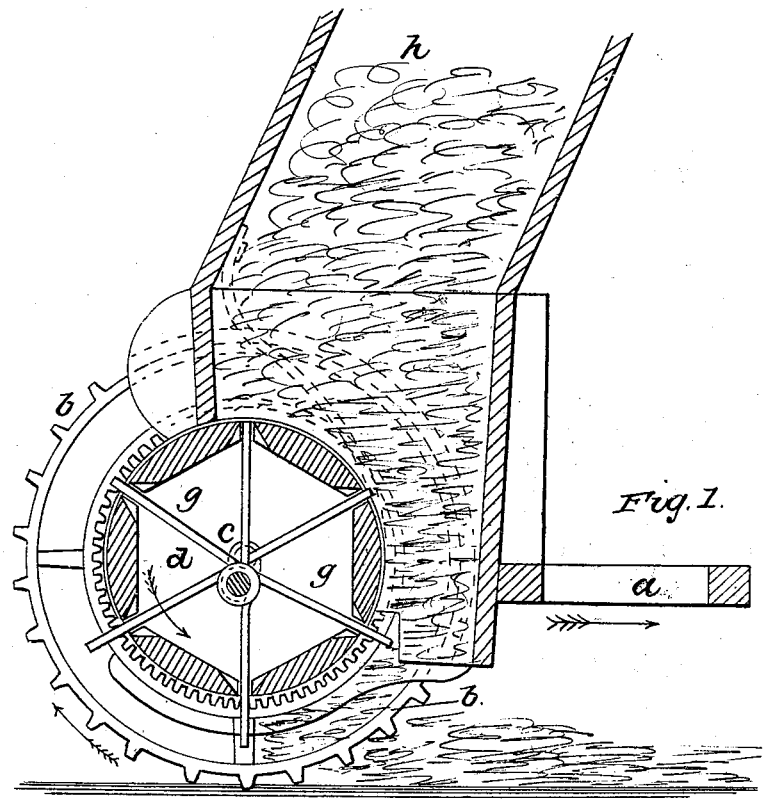
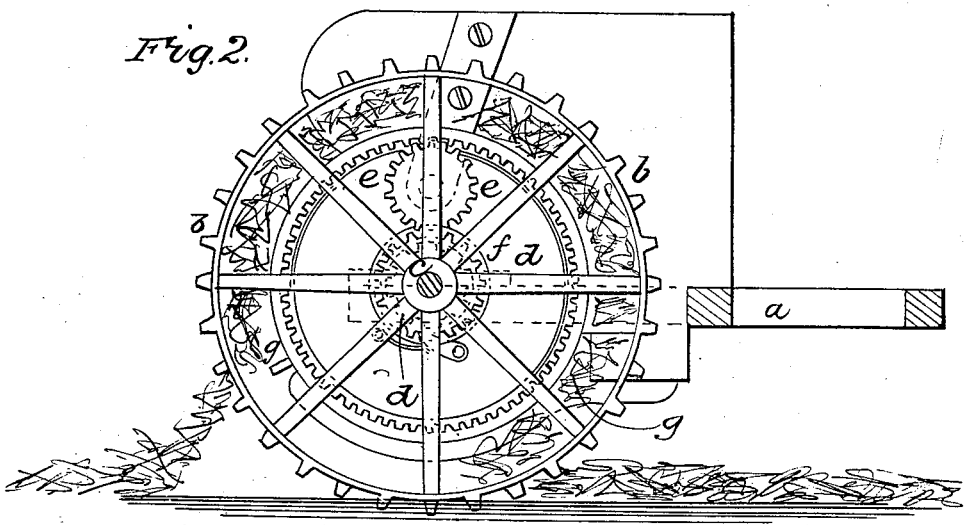

UNITED STATES PATENT OFFICE.

THOMAS C. CRAVEN, OF ALBANY, NEW YORK, ASSIGNOR TO HIMSELF AND WILLIAM H. DAVIS, OF SAME PLACE.

IMPROVEMENT IN COMBINED HAY SPREADERS AND ELEVATORS.

Specification forming part of Letters Patent No. 51,650, dated December 19, 1865.

*To all whom it may concern:*

Be it known that I, THOMAS C. CRAVEN, of Albany, in the county of Albany and State of New York, have invented, made, and applied to use a certain new and useful Improvement in Machinery for Tedding and Elevating Grass, Hay, &c.; and I do hereby declare the following to be a full, clear, and exact description of the said invention, reference being had to the annexed drawings, making part of this specification, wherein—

Figure 1 is a section of my machine with the elevating-trunk; and Fig. 2 is an end view of the same machine without the trunk for tedding grass, hay, &c.

Similar marks of reference denote the same parts.

The nature of my said invention consists in forcing the hay up a trunk or chute by means of a revolving cylinder armed with teeth, that also rakes up the hay or other material, and may be used for tedding the grass or other material when the trunk or chute is removed.

In the drawings, $a$ is a frame that may be attached behind a hay cart or wagon or drawn separately. This frame is sustained upon wheels $b\ b$, that sit loosely upon the stationary axle $c$.

$d$ is the raking-cylinder, armed with teeth, which cylinder also revolves on the axle $c$, but in the opposite direction to the wheels $b\ b$, the motion being communicated from the internal gears on the wheels $b$, through the pinion $e$, to the wheel $f$ on the hub of the cylinder $d$; and $i$ is a ratchet-wheel formed as a part of or connected to the pinion or wheel $f$, taking a pawl at the end of the cylinder $d$, so that the said cylinder will be rotated when the machine is drawn forward, but the wheels $b\ b$ may turn separately in backing or turning the machine around.

The cylinder $d$, revolving in the opposite direction to the wheels $b\ b$, will rake up and throw over itself the hay or other material, and to facilitate the delivery of the hay from the machine, I fit the raking-teeth $g$ so that they will withdraw near the upper part of the cylinder $d$ and be fully projected near the bottom part. This is accomplished by having the teeth pass through the holes in the cylinder $d$, and each tooth formed as an eye at its inner end, through which the axle $c$ passes, and said axle $c$, within the cylinder $e$, is bent down or crank-shaped, (see Fig. 1,) so that the teeth, as they are revolved around by the cylinder, are projected and retracted.

In order to employ my machine as an elevator or loader, I employ a trunk, $h$, which may be movable, as shown, and extended up in any desired manner, so that the teeth on the revolving cylinder $c$ may force said hay up the trunk and cause its delivery at the top in consequence of carrying in more at the bottom.

In order to cause the rake-teeth on the cylinder to pass clear of the hay or grass as that is forced up, it is necessary that the rake-teeth be hinged eccentrically, as shown, or else that guards be placed on the side of the trunk, as shown by dotted lines in Fig. 1, said guards passing in between the teeth and keeping the hay back as the teeth withdraw from the same by their rotation.

When this machine is used for tedding grass, hay, or other material, if it is desired to scatter the same more than can be done by the revolution of the rake-cylinder $d$, the same may be effected by a revolving scatterer made with arms or teeth and placed above the rake-cylinder, with the lower side of said scatterer revolving in the same direction but faster than the upper surface of the said cylinder $d$.

What I claim, and desire to secure by Letters Patent, is—

1. The mode herein specified of forcing hay or similar material up a trunk or chute by a revolving mechanism placed at the lower end of said trunk, to act continuously in raking up and elevating the hay, grass, or other material, substantially as specified.

2. A revolving rake composed of a cylinder with teeth projected and retracted by an eccentric movement, as set forth.

3. The revolving cylinder, armed with rake-teeth, in combination with the trunk $h$, wheels $b$, and gearing $e\ f$, as and for the purposes specified.

In witness whereof I have hereunto set my signature this 10th day of July, 1865.

THOS. C. CRAVEN.

Witnesses:
R. H. WELLS,
GEORGE H. SHOWDY.